United States Patent [11] 3,611,842

[72] Inventor Clifton S. Skipper
   P.O. Box 258, Chadburn, N.C. 24431
[21] Appl. No. 867,479
[22] Filed Oct. 20, 1969
[45] Patented Oct. 12, 1971

[54] ORNAMENT HEAD AND SHANK ALIGNMENT AND HOLDING HANDTOOL
6 Claims, 7 Drawing Figs.

[52] U.S. Cl. ................................................ 81/43, 269/6
[51] Int. Cl. ................................................ B25b 9/02
[50] Field of Search ................................................ 81/43, 180 B, 180 D, 420, 423, 6–8; 294/16, 99, 100, DIG. 2; 128/354; 269/2, 90, 3, 6

[56] References Cited
UNITED STATES PATENTS

| 201,404 | 3/1878 | George | 81/43 |
| 676,026 | 6/1901 | Burch | 269/6 |
| 964,526 | 7/1910 | Knapp | 81/43 |
| 1,067,696 | 7/1913 | Wallace | 81/43 X |
| 1,133,334 | 3/1915 | Strycker | 81/43 |

Primary Examiner—Robert C. Riordon
Assistant Examiner—Roscoe V. Parker, Jr.
Attorney—Gustave Miller ABSTRACT: This is a handtool for use by a jeweler for holding the ornament head and the ring shank in proper position while they are being unsoldered or soldered together in disassembling or reassembling a ring. It consists of a pair of resilient pincer levers secured together at one end, a locking double-headed pin slidably extending through parallel longitudinal slots in the pincer levers for holding the pincers in holding position, a stepped arm on the end of each pincer lever with fingers extending substantially parallel when held in locked position by sliding the double-headed pin toward the stepped arm ends, and confronting plates on the inside arm ends, at least one of the confronting faces of the plates having a longitudinally extending groove in which the ring shank is held with the ringhead held thereagainst by the face of the other plate.

In addition, an all purpose soldering block of hard asbestos or hard "transite" is provided as an attachment for the tool, the block having a groove for the shank, and also an ear receiving recess and aligned groove for receiving an ear bob and its post while being soldered together into a pierced earring.

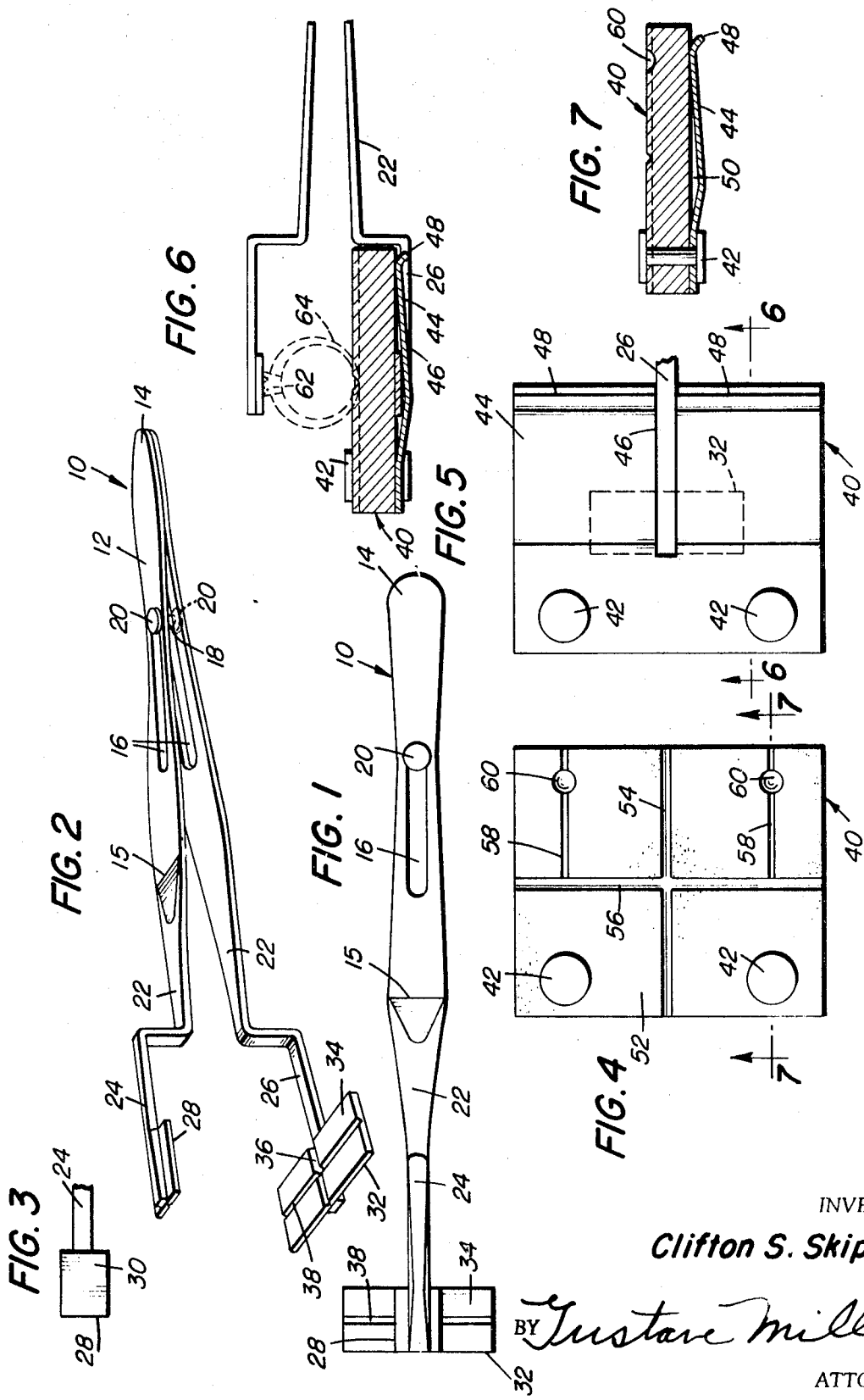

ORNAMENT HEAD AND SHANK ALIGNMENT AND HOLDING HANDTOOL

BACKGROUND OF THE INVENTION

It has always been a problem for the jeweler to change the head of a ring, to hold the ring shank and the ringhead together and keep them in alignment while soldering them together, or for unsoldering the head from the shank so that the head may be replaced with a desired different head. With this handtool, these problems are easily solved.

OBJECTS OF THE INVENTION

This invention relates to a handtool for holding head and ring shank in aligned position while soldering them together, or while unsoldering and separating them for replacement by a different combination of head and shank.

A further object of this invention is to provide an all purpose soldering block of transite or hard asbestos, to which gold and solder will not stick, as an attachment for use in combination with this handtool, which can be readily and quickly combined with or detached from the tool, the block also having cooperating grooves for receiving a ring shank, as well as an aligned groove and recessed hole for supporting an ear bob and post in aligned position for easy soldering.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is a top plan view of the hand tool of this invention.

FIG. 2 is a perspective view thereof, showing the confronting working face of one holding plate that is grooved.

FIG. 3 is a detail view of the confronting face of the other holding plate.

FIG. 4 is a top plan view of an all purpose soldering block attachment for this handtool.

FIG. 5 is a bottom plan view of FIG. 4, also showing in phantom its attachment to the tool.

FIG. 6 is a sectional view of the attachment block on line 6—6 of FIG. 5 showing the attachment thereon in operative position.

FIG. 7 is a sectional view on line 7—7 of FIG. 4.

There is shown at 10 the ornament head and shank alignment and holding handtool of this invention. This tool 10 consists of a pair of resilient pincer plier levers 12 permanently secured together at one end 14 and resiliently diverging at their opposite ends 15. These levers 12 are wide and flat in their resilient portions and intermediate their ends 14 and 15. Each lever 12 has a longitudinal slot 16 extending along the axis of the levers 12, aligned with and parallel to each other, and through these slots 16 there extends a double-headed locking pin 18 having its heads 20 contacting the outer surfaces of the respective levers 12.

At the end 15 of each of the flat resilient levers 12, there is integrally secured a rigid stepped arm 22 having offset extending fingers 24 and 26 that are substantially parallel to each other. On the confronting ends of the fingers 24 and 26 there is secured on the one finger 24 a rectangular plate 28 having a flat face 30, and on the other finger 26 there is a larger rectangular cross-grooved plate 32.

As will be observed, the plate 32 is much longer than the width of plate 28 and is as wide as the flat-faced plate 24 is long. The confronting face 34 of plate 32 has a fairly deep groove 36 extending centrally over and parallel to its finger 24, and a second but shallower groove 38 extending centrally at right angles to the first groove 36.

In FIGS. 4 through 7, there is shown an attachment for this handtool 10 which may be added to the handtool 10, enlarging the use for this tool 10. The attachment consists of a rectangular shaped block 40 of hard "transite" or hard asbestos, a hard material to which gold or solder will not stick. This provides an all purpose soldering block. Secured by rivets 42 to the backface of the block 40 is a resilient metal sheet 44 having a central finger (26) receiving slot 46 complementary to the finger 26. A curved lip 48 is provided along the edge, intersected by the central slot 46, and the body of the resilient sheet 44 is slightly spaced at 50 from the block 40 so as to receive and resiliently hold the cross-grooved plate 32 therebetween, as shown in FIG. 5.

The block 40 also has a cross-grooved face 52, which when attached as in FIGS. 5 and 6, confronts the flat face 30 of flat plate 28 on finger 24. The cross-grooved working face 52 has its central groove 54 parallel to finger 26 when attached, and its cross-groove 56 extending centrally at right angles thereto. Also, parallel to and on both sides of central groove 54 is another smaller groove 58 leading to a circular recess 60.

OPERATION OF THE INVENTION

This handtool 10 is for holding a head 62 in proper aligned position on a ring shank 64 while in the process of soldering the head 62 to the ring shank 64. It is likewise used in the same manner when unsoldering the head 62 from the ring shank, which may thus be done quickly at a jewelry store, as when a customer wants a different head on a ring, before or after he purchases it. The attachment block 40 may be used for large rings, or even for small bracelets, while the handtool 10 per se, without the attachment 40 is used for smaller rings. The double-headed locking pin 18 is slid toward the spaced ends 15 to converge the extending fingers 24 and 26 and their plates 28 and 32 to hold the ring shank 64 and its head 62 in aligned position while the soldering or unsoldering takes place. The shank may be placed in either cross-groove 36 or 38 as desired, according to its width and size. The block 40, when attached, is used in the same manner, as illustrated in FIG. 6.

The block is also useful in attaching an ear bob to its post for making a pierced earring. In such case, the bob is placed in one circular recess 60, and the post is placed in groove 58 in close contact therewith, enabling the soldering or unsoldering to take place properly. Thus a bob and post may be readily assembled or disassembled, and provide a pierced earring of a desired combination of bob and post, as well as making it possible to readily exchange a ring shank or head as desired.

In the drawing, like numbers refer to like parts, and for the purpose of explication, set forth below are the numbered parts of the improved ornament head and shank alignment and holding handtool:

10  ornament head and shank alignment and holding handtool
12  pair of wide, flat resilient pincer levers
14  permanent secured ends of levers 12
15  opposite diverged ends of resilient flat levers
16  axial, longitudinal slots in 12
18  double-headed locking pin through slots 16
20  heads on locking pin 18
22  rigid stepped arm integrally secured on lever end 15
24  offset finger on one arm 22
26  offset finger on other arm 22
28  flat-faced rectangular plate on finger 24
30  flat confronting face of 28
32  cross-grooved large rectangular plate on other finger 26
34  cross-grooved face of 32
36  deep groove on 34, parallel to finger 26
38  shallow groove on 34, at right angles to 36
40  attachment block
42  rivets
44  resilient attaching metal sheet
46  central slot in 44 complementary to finger 26
48  curved lip on edge of 44
50  space between sheet 44 and block 40 for receiving plate 32
52  cross-grooved working face of block 40
54  groove parallel to finger 26 when attached
56  groove at right angles to 54

58 parallel shallow grooves
60 circular recess at end of 58
62 ringhead
64 ring shank Although this invention has been described in considerable detail, such description is intended as being illustrative rather than limiting, since the invention may be variously embodied and the scope of the invention is to be determined as claimed.

Having thus set forth and disclosed the nature of this invention, what is claimed is:

1. An ornament head (62) and shank (64) alignment and holding handtool (10) comprising a pair of resilient flat levers (12) secured together at one end (14) in overlying relation with their other ends (15) resiliently diverging, said levers (12) having aligned longitudinal slots (16) intermediate their ends (14 and 15), a double-headed pin (18) slidably extending through said aligned slots (16), said double-headed pin (18) having its heads (20) contacting the outer surfaces of said levers (12) to converge and lock said diverging ends when said pin is slid toward said diverging ends (14 and 15), an outwardly stepped arm (22) extending from each said lever diverging ends (15), said arms (22) having extending fingers (24 and 26) in substantially parallel position when in converged position, and object holding confronting plates (28 and 32) secured on the terminal ends of said extending fingers (24 and 26), said plates being held in substantially parallel spaced-apart position by said stepped arms when in converged position.

2. The tool of claim 1, the confronting face (34) of one of said plates (28 and 32) being longitudinally grooved partially to receive the object (64) therein.

3. The tool of claim 2, the confronting face (30) of the other of said plates (28 and 32) being substantially flat.

4. The tool of claim 1, in combination with a soldering block (40), said block (40) being of hard asbestos, said block having a working face (52), an object-receiving recess (54, 56 or 60) in said working face (52), a resilient metal sheet (44) secured adjacent one edge to the opposite face of said block (40), said sheet (44) having a slot (46) extending through the opposite side edge from the secured side edge, said slot (46) being complementary to the width of one hand tool (10) extending finger (26), said resilient sheet (44) diverging away from its secured edge (at 42) then back toward said block and terminating in a lip (48) curving away from said block, whereby hand tool (10) extending finger (26) may be inserted in said slot (46) with its object holding plate (32) held between said resilient sheet (44) and said block (40) to thereby hold said block (40) on said tool (10), with a working face (52) confronting the confronting face (30) of the plate (28) on the other extending finger (24).

5. The combination of claim 4, the working face (52) of said block (40) having a longitudinal object-receiving groove (54 or 56) therein.

6. The combination of claim 5, the working face of said block having a groove (58) terminating in a recessed hole (60) to receive an ear bob in said hole (60) and an aligned ear bob post in said recessed groove (58).